United States Patent Office 3,644,434
Patented Feb. 22, 1972

3,644,434
ROOM TEMPERATURE VULCANIZABLE ORGANO-POLYSILOXANE ELASTOMER MATERIALS
Paul Hittmair, Wolfgang Kaiser, Siegfried Nitzsche, and Ernst Wohlfarth, Burghausen, Upper Bavaria, Germany, assignors to Wacker-Chemie G.m.b.H., Munich, Germany
No Drawing. Filed Dec. 10, 1968, Ser. No. 782,771
Claims priority, application Germany, Dec. 14, 1967,
W 45,346
Int. Cl. C08k 1/10
U.S. Cl. 260—375 B
6 Claims

ABSTRACT OF THE DISCLOSURE

Non-slump room temperature vulcanizable silicone rubber formulations based on hydroxyl endblocked linear siloxane polymers and amino cross-linking agents are prepared by adding silica fillers with surface area in the range from 100 to 200 m.²/g. and alkali aluminum silicate or alkali earth metal aluminum silicate molecular sieve to the formulations.

In organopolysiloxane materials which will cure to elastomers at room temperature (room temperature vulcanizable silicone rubber), distinction must be made between those which are prepared more or less immediately before they are used by mixing at least two components and those which will cure spontaneously in the air under the influence of the water vapor contained therein without any other additives, i.e., between the so-called "two-component" and the so-called "one-component" systems. The present invention relates to one-component room temperature vulcanizable materials, that is, it relates to organopolysiloxane materials which may be stored under the exclusion of water and which will cure to elastomers at room temperature upon exposure to water.

Materials consisting of diorganopolysiloxanes having reactive end groups and cross-linking amino-substituted organic silicon compounds, which can be stored upon the exclusion of water and which will cure to elastomers at room temperature when water is added, have already been known for some time. (For the sake of brevity, the materials of the diorganopolysiloxanes displaying reactive end groups and cross-linking amino-substituted organic silicon compounds, which may be stored upon exclusion of water and which will cure to elastomers at room temperature when water is added, will generally be called "amino one-component room temperature vulcanizable systems" in the material which follows.) The amino one-component room temperature vulcanizable systems, when compared with the other known materials of reactive end groups displaying diorganopolysiloxanes and silicon compounds having at least three hydrolyzable groups per molecule which have been known and which can be stored under the exclusion of water and which will cure to elastomers at room temperature upon the addition of water, have the advantage that they will not split off highly corrosive materials during the curing and/or are easier to obtain.

The known amino one-component room temperature vulcanizable systems have the disadvantages that they are not stable enough for certain applications especially for sealing perpendicular cracks which, for instance, will appear after mounting prefinished building parts, that is, they will run out of cracks or off of finished substrates before they will harden to elastomers if they do not contain considerable quantities of calcium carbonate with a particle size of less than four microns or silicon dioxide obtained pyrogenically from the gas phase. The known one-component systems which contain such fillers in large quantities, however, have the disadvantage that they yield elastomers of unsatisfactory mechanical stability or display a putty-like consistency so that they cannot be applied simply from a tube but must be processed by special spray or spatula apparatus which requires greater expense.

The amino one-component systems of the present invention, on the other hand, are stable and their consistency is such that they can be processed very easily without special spray or spatula apparatus, that is, they can be pushed from a tube and will give elastomers of satisfactory mechanical stability, especially high extensibility.

The discovery concerns materials composed of diorgano-polysiloxanes containing reactive end groups and cross-linking amino-substituted organic silicon compounds which can be stored upon exclusion of water and which will cure to elastomers at room temperature when water is added, characterized in that they contain 2 to 20 percent by weight calculated on the total weight of the organic silicon compounds of inorganic fillers with a surface of 100 to 200 m.²/g. and at least 0.2 percent by weight calculated on a total weight of the material of pulverulent alkali- or alkali earth aluminum silicates with molecular sieve properties.

The diorganopolysiloxanes displaying reactive end groups which can be used within the framework of the present invention can be the same as those which are commonly used for preparing room temperature vulcanizable silicone rubber stocks based on diorganopolysiloxanes which can be stored upon the exclusion of water which will cure to elastomers at room temperature when water is added. The diorganopolysiloxanes used for preparing such materials and which are also very suitable for the present invention can be represented by the general formula

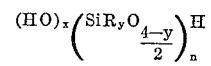

In this formula R represents a monovalent hydrocarbon radical which can be substituted if desired, $x$ has an average value of 0.99 to 1.01 $y$ has an average value of 1.99 to 2.01, the sum of $x+y$ is 3 and $n$ is a whole number of at least 3, preferably at least 50. The hydroxyl groups, if desired, can be at least partially replaced by other reactive end groups especially radicals of the general formula RNH—, wherein R is as above defined, Si-bonded hydrogen atoms, alkoxy or alkoxy-alkoxy radicals. As is shown by the average value of 1.99 to 2.01 for $y$, siloxane units of other degrees of substitution can be present in small quantities in addition to the diorganosiloxane units.

Examples of hydrocarbon radicals represented by R are alkyl radicals, such as methyl, ethyl, isopropyl and octadecyl radicals; alkenyl radicals such as vinyl and allyl radicals; cycloaliphatic hydrocarbon radicals such as cyclopentyl, cyclohexyl, cyclohexenyl and methyl cyclohexyl radicals; aryl radicals such as phenyl, xenyl and naphthyl radicals; aralykyl radicals such as benzyl, β-phenylethyl and β-phenyl propyl radicals; as well as alkaryl radicals such as ethyl phenyl and tolyl radicals.

The preferred substituted hydrocarbon radicals are halogen aryl radicals such as the chlorophenyl radicals, perfluoroalkylethyl radicals such as the β-trifluoromethylethyl radicals as well as the 3,3,3-trifluoropropyl radical and cyanoalkyl radicals such as β-cyanoethyl radicals.

Preferably, at least 50 mol percent of the R radicals are methyl radicals. The remaining R radicals which can be present are preferably phenyl and/or vinyl radicals.

The R radicals on the individual silicon atoms can be alike or different. In the diorganopolysiloxanes, these can be homopolymers, mixture of various homopolymers, copolymers or mixtures of various copolymers always with the same degree of polymerization, which indicates identical values for $n$, or in a mixture of like or different homo- or copolymers of various degrees of polymerization.

The viscosity of the diorganopolysiloxanes is expediently between 100 to 200,000 cs./25° C.

As cross-linking amino-substituted organosilicon compounds, which can be used within the framework of the present discovery, all those which are suitable for the preparation of materials which can be stored under exclusion of water and which will cure to elastomers at room temperature upon the addition of water based on diorganopolysiloxanes can be used. These include silicon compounds displaying at least three hydrolyzable groups with optionally acylated amino groups. The preferred cross - linking amino - substituted organic silicon compounds are amino silanes of the general formula $RSi(NH_mR'_{2-m})_3$. In this formula R is as above defined, R' is a monovalent hydrocarbon radical and $m$ is 0, 1 or 2, preferably 1. Examples of hydrocarbon radicals represented by R are also true for the hydrocarbon radicals represented by R' with the exception of the vinyl radicals. Other examples for hydrocarbon radicals represented by R' are n-butyl, tertiary-butyl, 3,5,5-trimethylcyclohexyl and 2,3,3-triethylcyclohexyl radicals. The preferred R' radicals are the n-butyl and the cyclohexyl radical. Other examples for cross-linking amino-substituted silicon compounds are silazanes of the general formula

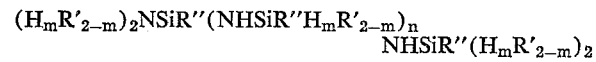

wherein R' and $m$ are as above defined, R" is the same as R or an alkoxy group with 1 to 4 carbon atoms and $n$ is 0 or a whole number with a value of at least 1. Compounds of the general formula $R''_pSiZ_{4-p}$ wherein R" is as above defined, Z is an amino alkoxy group and $p$ equals 0, 1, 2 or 3 such as monoethanolaminoorthosilicate and compounds of the general formula

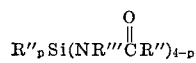

wherein R" and $p$ are as above defined and R''' is the same as R' or a hydrogen atom. (The value of $p$ must be such that a total of three hydrolyzable groups are present for each molecule.) Many of these compounds are described in United States patent application Ser. No. 615,350 filed Feb. 13, 1967, now Pat. No. 3,464,951, U.S. Pat. Nos. 3,032,528; 3,280,072 and 3,364,160 and German patent publication 1,224,039, all incorporated herein by specific reference thereto. Mixtures of various cross-linking amino-substituted organosilicon compounds may be used.

The cross-linking amino-substituted organosilicon compounds are expediently used in such quantities that there is at least 1 mol of the cross-linking amino-substituted organosilicon compounds per gram equivalent of the reactive end groups present in the diorganopolysiloxanes; preferably, 0.2 to 15 percent by weight especially 1 to 8 percent by weight, always calculated on the total weight of cross-linking amino-substituted organosilicon compounds are incorporated.

In addition to reactive end group-displaying diorganopolysiloxanes and cross-linking amino-substituted organic silicon compounds, materials of the present invention may contain as the already known components of amino one-component systems other materials frequently employed as additives in amino one-component systems. Examples of such materials are materials for reducing permanent deformation, pigments, soluble dyes, aromatics, corrosion inhibitors, oxidation inhibitors, heat stabilizers, flame inhibitors, light protectants, softeners such as fluid trimethylsiloxy endblocked dimethylpolysiloxanes, non-reinforcing fillers and non-volatile peroxides such as bis-2,2-dichlorobenzoylperoxide, and condensation catalysts such as dibutyltin dilaurate. Examples of non-reinforcing fillers, that is, fillers with a surface of less than 50 m.²/g. are diatomaceous earth, quartz flour, zirconium silicate, aluminum silicate, asbestos and glass fibers, metal powders such as aluminum and nickel powder, calcium carbonate with a particle size of less or more than four microns, carbon soot with a surface of less than 50 m.²/g. and metal oxides such as titanium dioxide, ferric oxide, aluminum oxide, magnesium oxide and zinc oxide insofar as their surface is less than 50 m.²/g. Mixtures of various non-reinforcing fillers can be used. Expediently, the total weight of the non-reinforcing fillers and the inorganic fillers with a surface of 100 to 200 m.²/g. is 5 to 90, especially 20 to 50 weight percent, always calculated on the total weight of the organic silicon compounds and the non-reinforcing fillers and the inorganic fillers with the surface size given.

When a "total weight of the organic silicon compounds" is mentioned within the framework of the present invention, this concept or this expression always means the total weight of the reactive end group displaying diorganopolysiloxanes and the cross-linking amino-substituted organosilicon compounds and possibly other organic silicon compounds which are also used, for instance, the organopolysiloxanes used as softeners.

As inorganic fillers with a surface of 100 to 200 m.²/g. silicas with a surface of 100 to 200 m.²/g. especially 130 to 150 m.²/g. are preferred. (The determination of the surface size of inorganic fillers preferably follows by measuring the nitrogen adsorption according to "ASTM Special Technical Bulletin" No. 51 (1941) p. 95ff.) These silicas include, for instance, fume silicas obtained pyrogenically in the gas phase, silica hydrogel dehydrated while maintaining the structure, that is, the so-called silica aerogels or precipitated silica. If desired, the silica with a surface of 100 to 200 m.²/g. can also be replaced by other inorganic fillers with a surface of 100 to 200 m.²/g. Examples of such fillers are metal oxides such as titanium dioxide, ferric oxide, aluminum oxide and zinc oxide insofar as they possess a surface of 100 to 200 m.²/g. If the surface of the inorganic fillers is smaller than 100 m.²/g., then the amino one-component systems are not sufficiently stable; if the surface is greater than 200 m.²/g., then the materials are too rigid. If desired, the inorganic fillers with a surface of 100 to 200 m.²/g. can display organosiloxy or alkoxy groups at their surface.

The pulverulent alkali metal or alkali earth metal aluminum silicates with molecular sieve properties used in addition to the inorganic fillers with a surface of 100 to 200 m.²/g. in the method of the present invention include natural and synthetic dehydrated zeoliths in their commercial pulverulent form. Especially good results are obtained if the alkali metal or alkali earth metal aluminum silicates are used in quantities of 0.5 to 2 percent by weight calculated on the total weight of the material. Greater quantities than 5 percent by weight calculated on the total weight of the material of alkali metal or alkali earth metal aluminum silicates can be used but result in no improvement with regard to stability.

All the above materials are generally used without special drying, that is, in their commercial form, for preparing the materials for the present invention without reducing the storage stability of the amino one-component systems which naturally must be stored avoiding the addition of water.

The components of the present invention are expediently mixed at room temperature and under the exclusion of water. Mixing the components of the materials of the present invention can follow in any desired succession. It has, however, been found that a very readily workable, paste-like, stable material is obtained if all components with the exception of the cross-linking amino-substituted organosilicon compounds are first mixed with each other and the cross-linking amino-substituted organosilicon compounds are slowly and steadily incorporated into the mixture thus obtained or incorporated in at least two portions. If the cross-linking amino-substituted organic silicon compounds are stirred in, in at least two portions, into the mixture of the remaining components, the amount of the first portion ought to be such that a stiff paste is obtained by adding the first portion and not so small that after addition of this first portion, a putty-like material remains nor so great that after the addition of this first portion a thinly-fluid paste is obtained. Depending on the type of the remaining components of the present invention, it is therefore expedient to add not more than 5 to 60 percent, preferably not more than 15 to 40 percent by weight of the total amount of cross-linking amino-substituted organic silicon compounds to be incorporated to the mixture of the remaining components in one portion.

The materials of the present invention can be stored in the absence of water; they will cure at room temperature under the action of water for which the normal atmospheric water content is sufficient. In addition to the water present in the air or instead of this, water from another source such as tap water, water vapor, water from crystal water-containing compounds can be used for curing the materials of the present invention to elastomers. The hardening can also be carried out at a temperature which is higher than room temperature, if desired. It will then proceed more rapidly.

The elastomers prepared from the materials of the present invention will adhere firmly to a great variety of materials such as glass, porcelain, wood, plaster, cement, stucco, metals, organic and organosilicon plastics. The materials of the present invention therefore are suitable, not only for sealing joints, especially perpendicular joints and similar hollow areas with width, for instance, of 20 to 50 mm., for instance, in buildings especially those of prefinished building materials, as well as land and aircraft but also as adhesives or putties; furthermore for dental closures as well as for the preparation of protective coatings, for preparing insulation for electrical conductors by enveloping the conductor with the materials, by spraying and for the preparation of molded articles.

The cross-linking amino-substituted organosilicon compounds used in the following examples were prepared as follows:

(A) To a solution of 297.6 g. (3 mol) cyclohexylamine in 7.5 l. of dry toluene, 74.5 g. (0.5 mol) methyltrichlorosilane was added dropwise under the exclusion of moisture by means of a calcium chloride tube, while stirring at $-5°$ to $+10°$ C. After the addition was terminated, the chlorosilane was stirred until the flask content was heated to room temperature. It was then filtered off from the amine salt and from the filtrate the toluene was evaporated at 12 mm. Hg absolute and a heat bath temperature of 50° to 80° C. The residue was a fluid consisting essentially of methyltris-(cyclohexylamino)-silane.

(B) The procedure described under A was repeated with the alteration that 3 mols of n-butylamine was used in place of the 3 mols of cyclohexylamine. A fluid was obtained consisting essentially of methyltris-(n-butylamino)-silane.

The following examples are included herein to aid those skilled in the art to gain a complete understanding of the invention and not to limit the scope of the invention which is properly delineated in the claims.

The mixing procedures described in the following examples were carried out at room temperature and under the exclusion of water.

EXAMPLE 1

7.5 kg. of a hydroxyl endblocked dimethylpolysiloxane having a viscosity of 80,000 cs./25° C. was mixed with 3 kg. of a trimethylsiloxy endblocked dimethylpolysiloxane, 35 cs./25° C., 3 kg. quartz flour, 1 kg. fume silica with a surface of 130 m.$^2$/g. and 150 g. of a pulverulent sodium aluminum silicate with molecular sieve properties and a pore diameter of 4 A. [this molecular sieve has the formula $Na_{12}(AlO_2)_{12}(SiO_2)_{12} \cdot 27H_2O$ before dehydrating it]. In the viscous mixture thus obtained, 150 g. of a fluid consisting essentially of methyltris-(cyclohexylamino)-silane was first stirred in. Into the rigid paste thus obtained, another 510 g. of the fluid consisting essentially of methyltris-(cyclohexylamino)-silane, was stirred in whereby the paste became smoother. The material thus obtained could be stored under exclusion of water and cured to an elastomer at room temperature in the presence of atmospheric moisture. This material was tested according to the "Preliminary Rules for Testing Joint Materials in Concrete Prefinished Buildings" (issue June 1967) No. 2.3 (appearing in "Beton- and Stahlbau" volume 62, 1967, No. 9) in the method given for stability in a perpendicular joint. Since the material does not run off the joint, it proves itself to be stable.

For purposes of comparison, the above procedure was repeated with the alteration that no sodium aluminum silicate was used. After adding the first part of the methyltris-(cyclohexylamino)-silane, the material is somewhat stiffer. After adding the second part of the amino silane, the material, however, is more fluid than before adding the first portion of the amino silane.

EXAMPLE 2

A mixture was prepared from 7.5 kg. of a dimethylpolysiloxane containing one hydroxyl group in each terminal unit, 20,000 cs./25° C., 3 kg. of a trimethylsiloxy endblocked dimethylpolysiloxane, 43 cs./25° C., 3 kg. calcinated and ground aluminum silicate, 1 kg. silica obtained pyrogenically in the gas phase with a surface of 140 m.$^2$/g. and 150 g. of a pulverulent calcium aluminum silicate with molecular sieve properties and having a pore diameter of 5 A. Into this viscous material, 150 g. of the fluid consisting essentially of methyltris-(n-butylamino)-silane was mixed. Into this resulting stiff rigid paste, another 510 g. of the fluid consisting essentially of methyltris-(n-butylamino)-silane was stirred in making the paste smoother. The material thus obtained can be stored under exclusion of water and will cure to an elastomer at room temperature upon the addition of water. This material was stable when tested by the test methods given in Example 1.

EXAMPLE 3

Equivalent results were achieved when Example 2 was repeated employing in place of the calcium aluminum silicate, an equivalent amount of barium aluminum silicate, lithium aluminum silicate, potassium aluminum silicate, or cesium aluminum silicate.

That which is claimed is:

1. A method for preparing non-slump silicone rubber stocks which are storable under substantial exclusion of water and cure to form elastomers in the presence of water comprising admixing (1) a diorganopolysiloxane having hydrogen atoms, hydroxy, alkoxy, alkoxy-alkoxy, or R'HN— radicals wherein R' is a monovalent hydrocarbon radical as endblocking units, (3) 2 to 20 percent by weight based on the organosilicon materials employed of an inorganic filler having a surface area in the range from 100 to 200 m.$^2$/g., and (4) from 0.2 to 5.0 percent by weight based on the total weight of the stock of a pulverulent alkali metal or alkaline earth metal aluminum silicate having molecular sieve properties and thereafter adding and mixing into the mixture of (1), (3) and (4), (2) a cross-linking amino-substituted organic silicon compound which is incorporated into the mixture in at least two portions, the first portion being 15 to 40 percent by weight of the total amino organosilicon compund.

2. A method in accordance with claim 1 wherein the diorganopolysiloxane (1) is endblocked with reactive groups selected from the group consisting of hydroxyl groups, hydrogen atoms, alkoxy radicals, alkoxyalkoxy radicals and radicals of the formula R'HN— where R' is a monovalent hydrocarbon radical.

3. A method in accordance with claim 2 wherein the diorganopolysiloxane is an essentially linear polymer of between 100 and 200,000 cs./25° C. and the organic substituents therein are selected from the group consisting of monovalent hydrocarbon radicals, monovalent halogenohydrocarbon radicals and cyanoalkyl radicals.

4. A method in accordance with claim 3 wherein at least 50 percent of organic substituents are methyl radicals and the balance of the substituents are selected from the group consisting of phenyl and vinyl radicals.

5. A method in accordance with claim 1 wherein the cross-linking amino-substituted organosilicon compound (2) is selected from the group consisting of amino silanes of the general formula $RSi(NH_mR'_{2-m})_3$ where R is a monovalent hydrocarbon radical, monovalent halohydrocarbon radical or cyanoalkyl radical, R' is a monovalent hydrocarbon radical and m is 0, 1 or 2, organosilazanes of the general formula

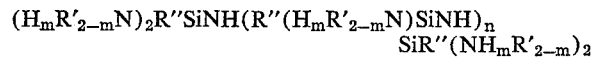

where R' and m are as above defined and R" is a monovalent hydrocarbon or halogenohydrocarbon radical, a cyanoalkyl radical or an alkoxy radical and n is an integer, silanes of the formula

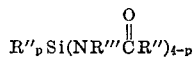

where R" is as above defined, p is 0, 1, 2 or 3, and R''' is a hydrogen atom or monovalent hydrocarbon radical, and silanes of the formula $R''_pSiZ_{4-p}$ where R" and p are as above defined and Z is an aminoalkoxy radical.

6. A method in accordance with claim 5 wherein the cross-linking amino-substituted organosilicon compound employed is an alkyltris-(alkylamino)-silane.

References Cited

UNITED STATES PATENTS

| 3,236,806 | 2/1966 | Dunham | 260—375 |
| 3,464,951 | 9/1969 | Hittmair et al. | 260—375 |

OTHER REFERENCES

Kirk-Othmer, Encyclopedia of Chemical Technology (2nd ed.), vol. 18, John Wiley and Sons, Inc., New York, 1969, pp. 64–70.

Modern Plastics Encyclopedia for 1967, vol. 44, No. 1A, September 1966, McGraw-Hill, New York, p. 589.

MORRIS LIEBMAN, Primary Examiner

S. M. PERSON, Assistant Examiner

U.S. Cl. X.R.

260—46.5 G